United States Patent
Gupta et al.

(10) Patent No.: US 9,483,756 B2
(45) Date of Patent: Nov. 1, 2016

(54) MECHANISM FOR MULTIPLE SYSTEM COMMON SCHEDULING AND ANALYSIS OF UNRELATED EVENTS IN A CORRECTIONS FACILITY

(75) Inventors: Atul Gupta, Grimes, IA (US); Rahul Kapoor, Charlottesville, VA (US)

(73) Assignee: Advanced Technologies Group, Inc., West Des Moines, IA (US)

( * ) Notice: Subject to any disclaimer, the term of this patent is extended or adjusted under 35 U.S.C. 154(b) by 269 days.

(21) Appl. No.: 13/435,018

(22) Filed: Mar. 30, 2012

(65) Prior Publication Data
US 2013/0262521 A1    Oct. 3, 2013

(51) Int. Cl.
G06F 7/00     (2006.01)
G06F 17/30    (2006.01)
G06Q 10/10    (2012.01)
G06Q 50/26    (2012.01)

(52) U.S. Cl.
CPC ....... *G06Q 10/109* (2013.01); *G06F 17/30699* (2013.01); *G06F 17/30705* (2013.01); *G06Q 50/26* (2013.01)

(58) Field of Classification Search
CPC .............. G06F 17/30699; G06F 17/30705
See application file for complete search history.

(56) References Cited

U.S. PATENT DOCUMENTS

| | | | |
|---|---|---|---|
| 2005/0114192 A1* | 5/2005 | Tor et al. | 705/8 |
| 2007/0041545 A1* | 2/2007 | Gainsboro | 379/188 |
| 2008/0122613 A1* | 5/2008 | Sanger | G06Q 10/10 340/539.11 |
| 2008/0201158 A1* | 8/2008 | Johnson et al. | 705/1 |
| 2009/0076832 A1* | 3/2009 | Collins | 705/1 |
| 2013/0179210 A1* | 7/2013 | Collins | 705/7.19 |

OTHER PUBLICATIONS

Westa et al. "The Handbook for Campus Crime Reporting", 2005, US Department of Education.*

* cited by examiner

*Primary Examiner* — Loan T Nguyen
(74) *Attorney, Agent, or Firm* — BrownWinick Law Firm

(57) ABSTRACT

A method is presented for use in correctional facilities to manage resources. Particularly, the method includes using a scheduling engine capable of receiving scheduling requests from other systems or direct entry of scheduling data and which is equipped to provide reports that inform the facility of the schedules of all inmates, transportation requirements, and space accommodations. The method may be employed for evaluating the needs for transportation and space and may also be used to generate reports that show relationships between inmates based on activities, locations, and time.

26 Claims, 4 Drawing Sheets

| 10 | Facility |
| 12 | Scheduling Engine |
| 14 | Means to cross-load |
| 18 | Stand alone system |
| 22 | Plurality of Systems |

MASTER SCHEDULE (excerpt)

| Date | Time slot | Resource | Offenders |
|---|---|---|---|
| 1/1/2012 | 0800 | Vehicle 1 | A, B, C, D, E |
| | | Meeting Room A | 1,2,3,4,5,6,7,8 |

RESOURCE UTILIZATION (A) (excerpt)

| Resource | Date | Units Avail* | Units Used | Utilization Rate |
|---|---|---|---|---|
| Vehicle 1 | 1/1/2012 | 25 | 20 | 80% |
| | 1/2/2012 | 25 | 20 | 80% |
| | 1/3/2012 | 25 | 15 | 60% |
| | 1/4/2012 | 25 | 20 | 80% |
| Meeting Room A | 1/1/2012 | 48 | 24 | 50% |
| | 1/2/2012 | 48 | 26 | 54% |
| | 1/3/2012 | 48 | 42 | 88% |
| | 1/4/2012 | 48 | 44 | 92% |

*Units Available = number of offenders hours per resource available that day

RESOURCE UTILIZATION (B) (excerpt)

| Resource | Period | Units Avail | Units used | Unused | Rate |
|---|---|---|---|---|---|
| Vehicle 1 | 1/1 - 1/31 | 440 | 310 | 130 | 70% |
| Vehicle 2 | 1/1 - 1/31 | 1760 | 1008 | 752 | 57% |

FIG. 4

MECHANISM FOR MULTIPLE SYSTEM COMMON SCHEDULING AND ANALYSIS OF UNRELATED EVENTS IN A CORRECTIONS FACILITY

FIELD OF THE INVENTION

The present invention relates to the tracking and reporting systems employed by correctional facilities and, more particularly, to the need for a single system having capabilities to aggregate all such data and provide reports that may include static data as well as data related to events wherein the data reported is typically arranged in chronological order.

BACKGROUND OF THE INVENTION

The treatment and management of incarcerated individuals is far more complex than most people not associated with prison systems and correctional facilities understand. With the advent of overcrowded prisons and computers, a variety of systems have been devised to allow the prisons to function. For example, most prisons have a system to track an offender's money account and use of the store/commissary, another system that stores an offender's health records, another that manages and tracks the work schedules of each offender and manages the jobs that need to be done, a separate system for managing the prisoner's case per se which may include his legal record, visits with counselors, lawyers, and recommendations related to rehabilitation. Further, there is a system that manages a few key future appointments for the offenders such as doctor appointments, meetings with legal counsel, and court appearances. Many of these systems are computerized, some are not. But, the fact remains, that these systems are most often separate and stand-alone.

Presently, correctional facilities do not have the ability to efficiently schedule an offender because there is no master scheduling mechanism that accounts for the time of all offenders, officers or for the resources required in order for the scheduled events to occur. There is certainly no mechanism for creating efficiencies among events for multiple offenders related to vehicles, rooms, and officers necessary. Further, no automation is available for managing resource allocation for groups of offenders with common needs but which may include offenders that are known enemies or collaborators. For examples, different events have different priorities and are scheduled by different people. A court date will be scheduled for an offender's court appearance. In the current state of correctional facilities, a counselor may then schedule a mental health assessment at the same time for the same inmate while a doctor might schedule a physical exam, again for the same time slot. None of the service providers have access to the appointments made by other service providers for the same offender or offenders. In this case, the court appearance is court ordered and will, therefore, take priority. The counselor and doctor both will be waiting for the offender to attend the other appointments. This is a waste of resources and is a chronic problem in correctional facilities.

A need for chronological reproduction of past events also exists. When a negative event occurs in a corrections facility (prison, residential and/or half-way houses, etc), the officials must investigate to determine what happened and then, determine how to prevent its happening in the future. In order to do so, they employ a number of different methods to piece details together. Those involved are usually interviewed. Time-stamped data or other information from the multiple systems described above may be retrieved in an effort to determine, for example, exactly what events transpired, what individuals were present, how the individuals involved may have interacted in the past, who else these individuals are associated with, what opportunities the individuals may have had to orchestrate the event, where the individuals were prior to the incident, whether medications had been administered accurately, etc. Putting together that kind of timeline is, presently, difficult and time consuming and, typically, yields only a very general and undetailed timeline. Further, the data presently available in the various separate systems may not provide as complete a picture as would be helpful.

What was needed was means to have a central clearinghouse responsible for managing and tracking offender schedules and enforcing priority of events. A system was needed to coordinate time scheduled and reserved on different systems related to a single offender, to resources available such as transportation and space, and means to inquire and generate reports about past and future events and scheduled appointments during a particular time frame either for a single offender or for a group. A system was also needed to coordinate all of the offenders' scheduled appointments with resources such as transportation, etc., and determine when a particular resource has been allocated to its capacity.

To meet the needs described above, the scheduling system will need to: contain or be able to received and process all the scheduling data presently stored in separate systems, to schedule future events, to analyze past events, to allocate resources and provide reports related to that allocation for determination of oversupply or high demand, and to provide chronologically-ordered reports of data fields from the separate systems in accordance with predetermined report formats and custom reports created by the user.

The first objective of the present invention is to provide a scheduling engine to manage future events, incorporate all past events, and generate chronological sets of event data.

The second objective is to provide a scheduling engine for generating chronological sets of event data wherein the chronological sets may include detail related to interaction between offenders, movement and location of specified offenders, and means to determine interactions or times when there were common locations between offenders.

The third objective is to provide a scheduling engine capable of accepting scheduling requests from other systems, and tracking all events related to an offender and all time obligations of an offender so that double-scheduling does not occur. The system should include means of setting a hierarchy among possible events and allow scheduling of higher priority events and/or changing schedules related to lower priority events.

A fourth objective is to identify an offender's unscheduled times and provide a clear means of projecting location of any offender at a given time.

A fifth objective of the system is to provide capability to track resources such as vehicles, rooms, officers as they are allocated, determine when a resource has been completely allocated, and suggest ways to reschedule offenders to more efficiently allocate the resources.

SUMMARY OF THE PRESENT INVENTION

The present invention provides systematic means to combine all data from all present tracking and scheduling systems in a corrections facility, and to provide a master scheduling function for all future events.

The system provides means to set priority levels on certain events such as court dates, doctor's appointments such that in the case of conflict for a time slot, a rule is applied to reschedule the lower priority and/or generate a report of a canceled event in accordance with the hierarchy rule.

The present invention tracks the resources such as vehicles, officers, space which are needed to accommodate the events scheduled in a given time slot. Further, the system may alert a manager when a particular resource has been completely allocated, or may be set to re-schedule certain events to more efficiently use the resources available.

Further, the system will include means for reviewing past events in aggregate for an individual or in aggregate for a group of individuals, in either case the review may be presented in a chronological manner. Such reviews may include any or all of the data related to a selected individual or group of individuals in that time frame. The review data set may include all data or a subset of data available related to the selected individuals.

For example, the review data set may look only at locations of the offender during the time span. Or it may present the locations of an offender, chronologically listed, in addition to information such as administration of medications during that time frame. The review data set may look for the names of other offenders with which the subject offender shared locale during that time frame, or at the telephone use by the offender during that time. The permutations of data combinations pertaining to an offender, or a group of offenders, related to chronology are endless, and could provide a variety of snapshots of events and associations during a particular time frame.

Further, if staff and offenders are all required to wear RFID tags, the presence of staff and identification of staff relative to the location of the subject offender or group of offenders may also be reviewed. If staff members regularly record reports or contacts with specific offenders, these notes/recordations may also be populated in the report based on time of report and/or time recorded in the report of the contact.

The system is also configured to gather data related to all events that occurred during a selected time frame, and look for offender associations in accordance with pre-set or user generated criteria.

The system may be used to manage future time periods. For example, it can be used to generate previews of scheduled events and activities for a single offender or a group of offenders. The preview may also be subject-matter based such as providing a preview of all medical appointments, or all legal appointments in the next week. The system may also be configured to allow scheduling of events in the other systems.

Other objects, features, and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

BRIEF DESCRIPTION OF THE DRAWINGS

FIG. 4 is a schematic showing a report generated by the scheduling engine of the present invention.

DETAILED DESCRIPTION OF THE PRESENT INVENTION

Figure 1:
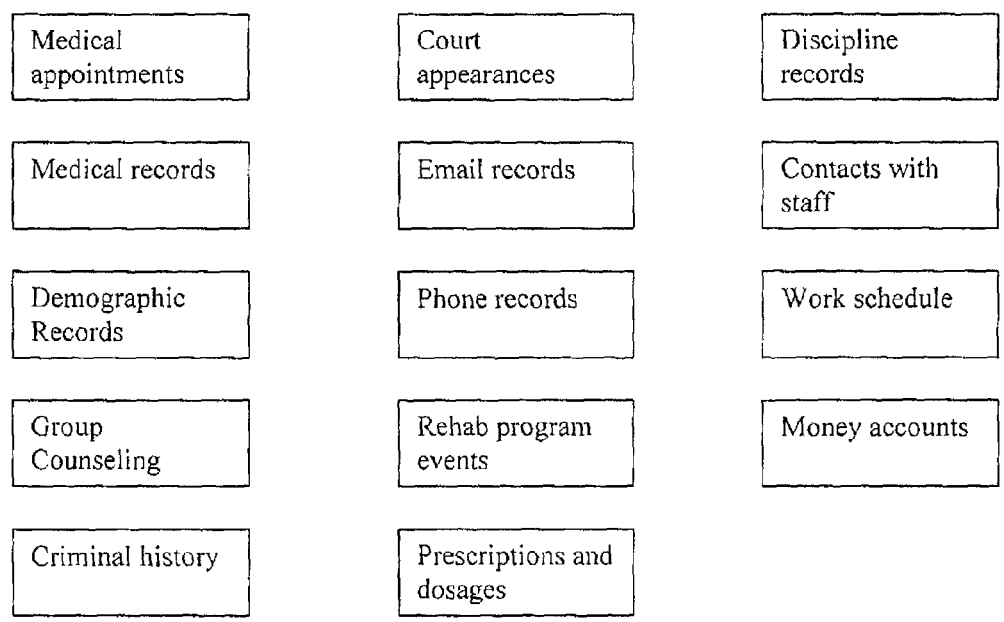
FIG. 1 is a schematic showing the various separate scheduling means employed by many correctional facilities in the prior art.

FIG. 1 shows the typical prior art arrangement in many correctional facilities that includes a plurality of separate, stand-alone systems for managing various sets of data related to a given individual, said sets of data may include some or all of the following: appointments, administration of medicine, telephone usage, email records, work schedules, counseling appointments, legal appointments, court appearances, medical appointments, medical records, money account, spending account, health records, criminal history, demographic and personal information, contacts with staff at the facility, discipline records, group participation, and records related to other rehabilitation strategies. Much of the data or records in each of said sets of data in the stand-alone systems include a date/time stamp for time of entry, or include a date/time field or fields relating to scheduled or completed tasks or events.

Figure 2:
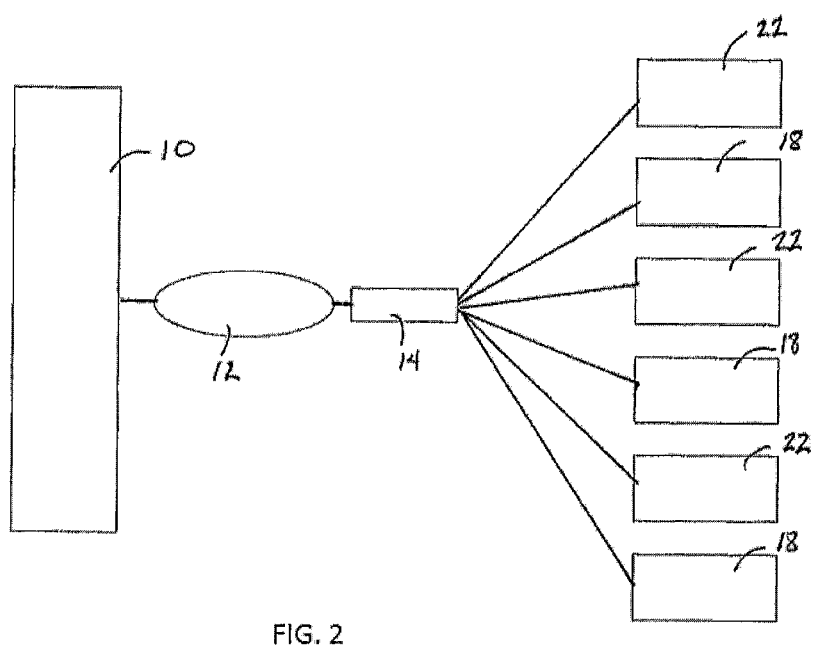
FIG. 2 is a schematic showing data paths from scheduling means present at the correctional facility to a scheduling engine employed by the method of the present invention.
Figure 3:
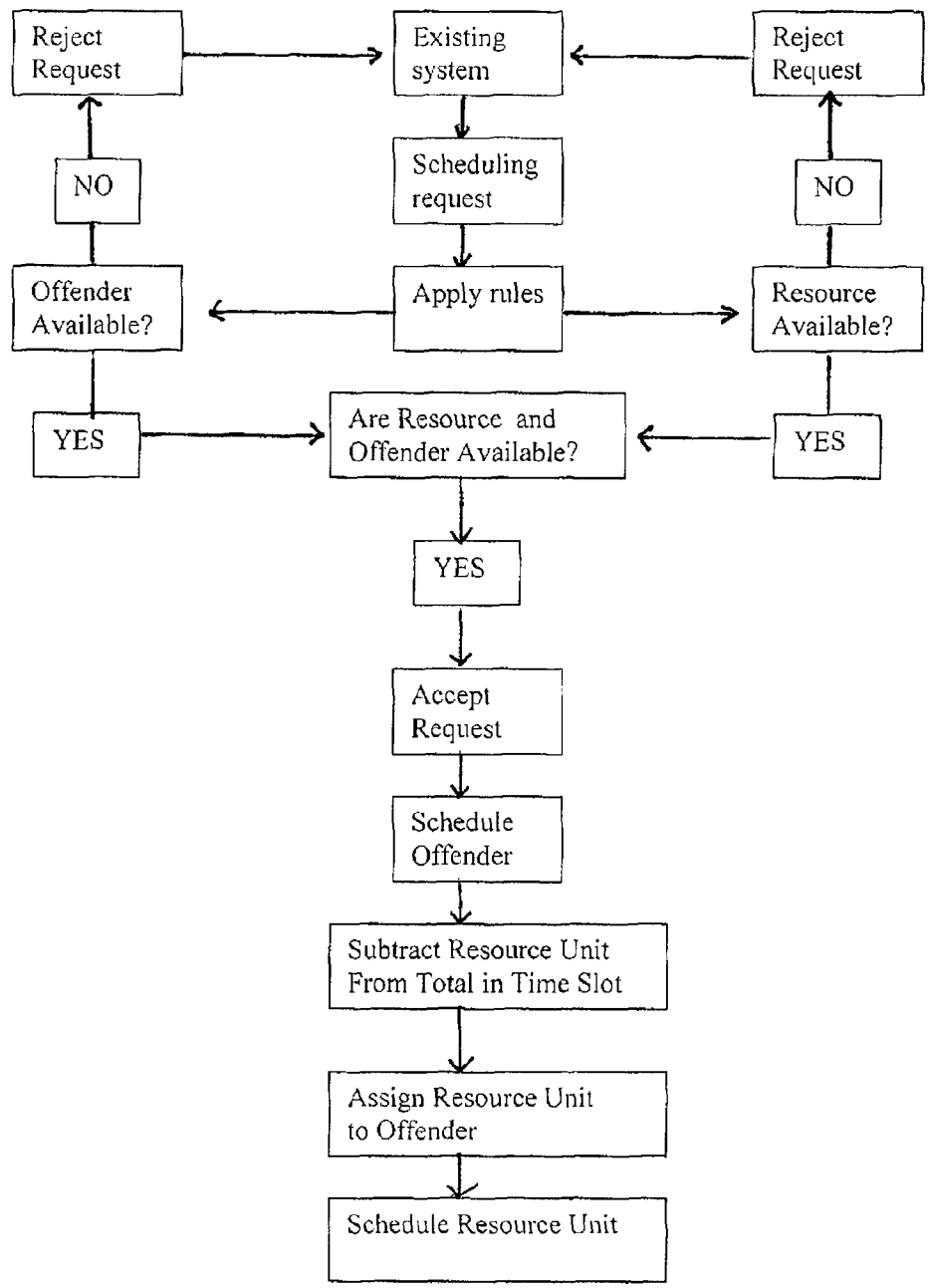
FIG. 3 is a flowchart showing the operation of the method of the present invention.

In one embodiment, the present invention (for example, that shown in FIG. 2) comprises a facility 10 and a scheduling engine 12 comprising means to cross-load 14 at least one set of data (or a subset of said at least one set of data or a set of data related to a specified date (and/or time) from each of a plurality of stand-alone systems 18 or to accept a scheduling request from each of a plurality of systems 22 to schedule events. Further, the scheduling engine 12 comprises means for creating and generating reports wherein said reports may optionally include arrangement of certain data or records in chronological order. A report 32 may be graphic, for example including a timeline or a calendar or an hourly chart upon which the data appears, or may be in the form of text or spreadsheet. See FIG. 4 for examples of excerpts of reports related to scheduling and utilization.

Another embodiment of the present invention comprises the receipt of data by the scheduling engine 12 from various locations 18 in the facility where a plurality of detectors are placed to detect and record the presence and, then, absence of an RFID badge or similar signaling device worn by an offender in the vicinity of a detector. This system may also detect presence and, then, absence, of signaling devices worn by staff. Where this information is collected, the scheduling engine 12 may be polled to assist in event analysis, offender associations, determination of traffic, etc.

An embodiment of the present invention may comprise resource allocation analysis and scheduling means. Here, the scheduling engine 12 tracks a resource as it is allocated for a particular event scheduled for an offender. For example, the system will set a flag for a scheduled event for an offender that will require transportation. Or, the scheduling engine 12 tracks a resource as it is allocated for any given time slot so that a manager can manage whether resource allocation could be managed for higher efficiency.

In another embodiment, a set of rules related to a resource may be set to assist in efficiency of use. For example, if transportation vehicles are of varying capacities, the scheduling engine 12 may be provided with rules so that when a particular time slot is schedule with a threshold number of offenders going to the same locale, a particular vehicle is assigned. In another embodiment, the rules include surveying of transportation resources already allocated and rescheduling of certain appointments or events by the scheduling engine 12 in order to better use the transportation resource These same principles may be applied to space allocation, officer assignment, etc., with hierarchy rules, alerts and reports acting to effect the desired efficiencies.

The present invention may be used in a number of other ways, among them to: analyze past events for improvement of safety conditions, evaluate the relationship of a certain event or events with recidivism or detect patterns of events related to recidivism, schedule future events, and assess needs in the facility, etc. For example, the scheduling engine may provide reports that allow a correctional facility to analyze whether resource requirements such as additional space may be needed, or whether the larger transportation vehicle is not utilized to its capacity very often and may be better converted to two smaller vehicles, or whether there are certain times of certain days where additional officers may be advantageously hired on a part time basis to effect the necessary ratio of officer to offender in particular situations, and reduced for other times of the day.

The present invention is supported by the scheduling engine 12 which may be comprised of several functional aspects. The functional aspects may include a data processing means, rules application, system for receiving data from other systems in the facility, means for allowing data entry, and report design and generation. The system may or may not include wireless communication with some or all of its functional aspects which may be electronically and/or physically separated, or may be via connection through user terminals service providers through their terminals. The scheduling engine 12 may comprise an embedded processor, a digital signal processor, a microprocessor, a computer or any other data processor. If wireless connections are employed, the wireless communications systems involved may comprise currently commercially available systems such as a global system for mobile communication, a code-division multiple access system, a frequency modulated system, a Personal Communications Service system, a cellular communication systems, a messaging system, an analog cellular system supporting Cellular Digital Packet Data. However, this listing is not meant to be limiting in any way, and it is acknowledged that other means for wireless communication will be developed in the future and that the use of those future means in the present invention's communications is contemplated herein and considered to be part of the term "wireless communication" as used herein.

The specific uses of the system of the present invention are myriad. The following examples will provide but a few possibilities.

EXAMPLE 1

Offender 1 is involved in an altercation that includes a weapon. The present invention provides reports of the whereabouts of the offender in the 48 hours preceding the event as well as the identity of other offenders in the same locale. Further, the report arranges offenders in the same locale by number of times the two were in the same locale over the previous three days. The report also shows known associations if any are in the system; for example, a system record indicates the offender with highest incidence of common locality is known to associate without animosity with offender 1, the offender with the second highest incidence (offender 2) is not known to associate with offender 1, and the offender with the third highest incidence was the victim without known association with offender 1. The report shows that offender 1 and offender 2 worked the same shift on kitchen duty three days ago albeit they usually do not. The report also shows that the victim and offender 2 had an altercation a week ago. Staff contact notes made six days ago indicate a need to monitor offender 2 for possible retaliatory behavior. Upon further data search it is determined that Offender 1 previously attacked another offender seemingly without provocation. Based on this information, staff decide to further investigate the length of time of contact and number of contacts between offender 1 and offender 2 for a period of time dating from before they worked the shift together until the altercation on the theory that offender 1 may have attacked the victim on behalf of victim 2.

EXAMPLE 2

The facility has begun a new program of connecting via email an offender with a career counselor. The career counselor enters time slot when he is available to correspond or meet with an offender; the offender then makes an appointment within the allocated schedule. The scheduling engine can be set with rules that will enforce the number of required scheduled appointments by sending reminders to the offender to set appointments and/or by reporting when appointments are not scheduled or are missed. This process assists in teaching an offender a new set of computer skills, as well as providing a means for an offender to take responsibility and be self-reliant.

The counselor may not only keep appointments with the offender, but is also able to schedule and administer to the offender aptitude, ability and interest tests via computer, discuss the results of the assessments with the offender, and provide such services and recommendations as a prescription for education and work experience the offender may accomplish while in prison in order to be prepared to seek such employment when he is released. The scheduling engine may then schedule work experience within the correctional facility that is in line with the counselor's suggestions. The counselor may have at least monthly email contact with the offender for the time period in which the offender is engaged in acquiring the appropriate education and experience, and, thereafter, bi-monthly until the offender is released. The present invention provides means of tracking the email exchanges for compliance, tracking the enrollment and progress of the offender in recommended classes, and re-assigning and scheduling work by the offender in the facility as recommended by the prescription. After the offender is released, the present invention may be used by the parole officer to track the employment efforts of the parolee. Finally, the present invention will be able to provide reports related to whether those who complete this program were re-arrested, whether the time after release to re-arrest was longer or shorter than for those not partaking in the program, whether those who complete the program were more likely to find employment and/or more likely to remain employed for longer.

EXAMPLE 3

The facility's budget has been reduced, albeit the number of offenders has increased. The facility is considering whether to engage in a commercial endeavor using offenders as workers. In order to determine whether there are enough offenders with the appropriate skill sets for the business endeavor being considered, and whether there are enough man hours available to adequately staff the endeavor, a record of participation and behavior that indicates a reasonable employee attitude, and an analysis of the other time commitments of these offenders is polled via the scheduling engine of the present invention. The search locates all offenders with a high school diploma, work experience related to auto mechanics, offender records that include indications of positive participation in counseling sessions, offender records that indicate no problems with fellow workers in the past six months, and offenders whose work responsibilities may be filled by another offender in order to free up the time necessary to man the new endeavor.

EXAMPLE 4

A further example would be if the facility wishes to run a multiple-session intervention program to teach offenders a particular social skill. The scheduling engine would support the need to find and schedule common "time availability" for all the offenders selected for the multiple days/duration needed and also manage the other resources needed to conduct the sessions such as availability of the group leader and finding or re-allocating a space sized in accordance with the group's size.

Thus, the present invention has been described in an illustrative manner. It is to be understood that the terminology that has been used is intended to be in the nature of words of description rather than of limitation.

Many modifications and variations of the present invention are possible in light of the above teachings. For example, the system may include information collected during the offender's parole. It may include data entered by staff related to incident reports or to an individual offender, or it may be restricted to reporting only data that has a time/date field and none without. It may be employed as a means of modeling certain types of prisoners and predicting their behaviors, or when negative behaviors are likely to occur. Therefore, within the scope of the appended claims, the present invention may be practiced otherwise than as specifically described.

We claim:

1. A method for managing data in a correctional facility comprising:
cross-loading a plurality of data records from each of a plurality of other data collection systems in the facility to a common scheduling engine, the common scheduling engine having hierarchy rules that set priority related to at least one selected from the group consisting of transportation available, time slot, population, equipment, room, staff and appointment type, the common scheduling engine being further configured to overwrite or change a schedule based on the hierarchy rules;
using the plurality of data records to at least one of schedule non-visitation related events and track inmate activity unrelated to visitation; and
generating a report of an offender in a vicinity of a criminal incident, the report including information about the whereabouts of the offender for a preset time period before the criminal incident as well as the identities of other offenders sharing common vicinities with the offender in the preset time period.

2. The method of claim 1, further comprising:
selecting a report from a plurality of preset reports;
running the report against the plurality of data records; and
providing a report of the plurality of data records returned in a chronological order, wherein at least some of the plurality of data records include a date stamp.

3. The method of claim 1, wherein the common scheduling engine includes a means to construct and generate reports.

4. The method of claim 3, wherein said reports comprise data presented in chronological order.

5. The method of claim 1, wherein the common scheduling engine includes a means to construct and generate reports and at least one said report provides resource allocation within the correctional facility for a selected time slot.

6. The method of claim 1, wherein said common scheduling engine further comprises means to upload hierarchy rules.

7. The method of claim 6, wherein said common scheduling engine further comprises means to generate reports.

8. The method of claim 7, further comprising:
applying the hierarchy rules to generate the reports.

9. The method of claim 3, wherein the means to construct and generate reports provides a report of all allocated resources for a given time slot.

10. The method of claim 3, wherein said common scheduling engine includes a means to generate alerts when a resource is near complete allocation for a given time slot.

11. The method of claim 3, further comprising:
using the common scheduling engine to apply a set of hierarchical rules and reset at least one date associated with at least one cross-loaded record in order to manage allocation of at least one resource selected from the group consisting of time, personnel, transportation, and space.

12. The method of claim 3, wherein said means to construct and generate reports includes a means to generate reports related to an offender.

13. The method of claim 12, wherein said reports include all time related events pertaining to a single offender.

14. The method of claim 12, wherein said reports include all time related events pertaining to more than a single offender.

15. The method of claim 12, wherein said reports include criteria for determining which offenders were commonly present at various events over a particular time period.

16. The method of claim 1, further comprising: using the common scheduling engine to survey the schedules of a plurality of offenders, find the least scheduled time slot for each of the offenders in the plurality, and schedule a single event for said plurality of offenders.

17. A system for managing data in a correctional facility comprising:
a common scheduling engine having a microprocessor, the common scheduling engine being configured to have access to a plurality of data related to each of a plurality of offenders in the facility,
use the plurality of data records to at least one of schedule non-visitation related events and track inmate activity unrelated to visitation, and
generate a report for inmates in a vicinity of a criminal incident using the tracked inmate activity, the report including identities of the inmates as well as their whereabouts for a preset time period before the criminal incident occurred,
wherein said common scheduling engine is further configured with hierarchy rules that set priority related to at least one selected from the group consisting of transportation available, time slot, population, equipment, room, staff, and appointment type, and wherein the common scheduling engine is further configured to overwrite or change a schedule based on the hierarchy rules.

18. The system of claim 17 further comprising:

means to create reports.

19. The system of claim 18, wherein said common scheduling engine further comprises means to accept and process scheduling requests from other systems for creating a master schedule.

20. The system of claim 19, wherein said scheduling requests pertain to scheduling inmate appointments and said master schedule comprises the schedules of all inmates.

21. The system of claim 19, wherein said scheduling requests pertain to scheduling transportation needs and said master schedule comprises the schedules for all modes of transportation.

22. The system of claim 20, wherein said scheduling requests further pertain to scheduling transportation needs and said master schedule further comprises the schedule for all modes of transportation.

23. The system of claim 22, wherein said scheduling requests further pertain to scheduling meeting rooms and said master schedule further comprises the schedule for all meeting rooms.

24. The method of claim 1, wherein the cross-loading the plurality of data records from each of the plurality of other data collection systems in the facility includes cross-loading data from a plurality of correctional facilities.

25. The method of claim 1, wherein the common scheduling engine is configured to receive a first scheduling request from a first system and a second scheduling request from a second system and, based on a hierarchy, allow scheduling of a higher priority event and change a schedule of a lower priority event.

26. The method of claim 1, further comprising:

at least one of evaluating a relationship of a certain event or events with recidivism and detecting patterns of events related to recidivism.

* * * * *